United States Patent [19]

Spangler et al.

[11] Patent Number: 5,433,101
[45] Date of Patent: Jul. 18, 1995

[54] METHOD AND APPARATUS FOR SELF-TESTING A SINGLE-POINT AUTOMOTIVE IMPACT SENSING SYSTEM

[75] Inventors: Leland J. Spangler, Ann Arbor; Michael C. Graf, Allen Park, both of Mich.

[73] Assignee: Ford Motor Company, Dearborn, Mich.

[21] Appl. No.: 89,198

[22] Filed: Jul. 12, 1993

[51] Int. Cl.6 ............. B60R 21/32; G01P 21/00; B60L 3/00
[52] U.S. Cl. ................. 73/1 D; 280/735; 180/282; 340/436; 364/424.05; 307/10.1
[58] Field of Search ............. 73/1 D; 180/268, 271, 180/274, 282; 280/734, 735; 307/10.1; 340/436, 438, 500; 361/1; 364/424.05

[56] References Cited

U.S. PATENT DOCUMENTS

| | | |
|---|---|---|
| 3,863,208 | 1/1975 | Balban . |
| 3,921,129 | 11/1975 | Sumida . |
| 4,243,971 | 1/1981 | Suchowerskyj et al. ............ 340/436 |
| 4,359,715 | 11/1982 | Langer et al. . |
| 4,853,623 | 8/1989 | Sterler et al. ................ 324/158 R |
| 4,873,452 | 10/1989 | Morota et al. ................ 307/10.1 |
| 4,950,915 | 8/1990 | Spies et al. ................ 307/10.1 |
| 4,987,316 | 1/1991 | White et al. ................ 307/10.1 |
| 4,990,884 | 2/1991 | McCurdy et al. ............ 340/438 |
| 4,999,775 | 3/1991 | Muraoka .............. 364/424.03 |
| 5,060,504 | 10/1991 | White et al. ................ 73/1 D |
| 5,073,860 | 12/1991 | Blackburn et al. ............ 364/424.05 |
| 5,081,442 | 1/1992 | Ito et al. ................ 340/438 |
| 5,101,192 | 3/1992 | Ishizuka .............. 340/436 |
| 5,103,667 | 4/1992 | Allen et al. ................ 73/1 D |
| 5,107,245 | 4/1992 | Gesper et al. ............ 280/735 |
| 5,216,607 | 6/1993 | Diller et al. ................ 364/424.05 |
| 5,277,053 | 1/1994 | McLane et al. ............ 73/1 D |
| 5,337,238 | 8/1994 | Gioutsos et al. ............ 364/424.05 |
| 5,369,305 | 11/1994 | Duhan et al. ............ 307/10.1 |

FOREIGN PATENT DOCUMENTS

| | | | |
|---|---|---|---|
| 3816590 | 11/1989 | Germany ............ | 280/735 |
| 4208714 | 9/1992 | Germany ............ | 280/735 |
| 4209140 | 9/1992 | Germany ............ | 280/735 |
| 217356 | 9/1991 | Japan ............ | 280/735 |
| 2144225 | 2/1985 | United Kingdom . | |

OTHER PUBLICATIONS

"Self-Testable Accelerometer Systems" by Henry V. Allen et al, Transducers, 1989, IEEE Article TH0249-3, pp. 113-115.

"Accelerometer Systems with Self-testable Features" by Henry V. Allen et al., Sensors and Actuators, 20 (1989), pp. 153-161.

Meister et al., "Air bag impact sensing", *Automotive Engineering*, Apr., 1993, pp. 11-13.

*Primary Examiner*—Hezron E. Williams
*Assistant Examiner*—Daniel S. Larkin
*Attorney, Agent, or Firm*—Roger L. May; Richard D. Dixon

[57] ABSTRACT

A method and apparatus for detecting faults in a single-point impact sensing system having electrically conductive self-test plates within the sensor to electrostatically deflect the sense element during self-test sequence. The deflection of the sense element is identical to deflection which would occur during an actual activation worthy impact event. The response time from the deflection of the sense element to the change in state of an activation flag is recorded and compared with an expected response time stored in non-volatile memory. Differences between the test time and the expected time is indicative of either a hard fault such as malfunction or reduced function of sensing system components or soft faults such as loss of calibration. Diagnostic self-test in this manner not only checks the electrical continuity of the impact sensing system, but also the mechanical integrity and the calibration of the sensing system.

17 Claims, 5 Drawing Sheets fig=2

METHOD AND APPARATUS FOR SELF-TESTING A SINGLE-POINT AUTOMOTIVE IMPACT SENSING SYSTEM

TECHNICAL FIELD

The present invention relates generally to a method and apparatus for testing an impact sensing system for use with a vehicle passenger restraint mechanism and, more particularly, to a method and apparatus for on-board testing of an impact sensing system after installation of the system in the vehicle.

BACKGROUND ART

Various types of impact sensors and impact sensing systems are used in automotive passive passenger restraint mechanisms such as airbags or automatic seat belt tensioners. These impact sensing systems are designed to sense high vehicle impact conditions and determine if and when activation of a passenger restraint is required for a given impact condition. Discrimination between activation worthy and non-activation worthy events ensures that the passenger restraint is activated only when necessary.

Most impact sensing systems can be placed in one of two categories. One type of system uses a plurality of mechanical threshold switches in the front region of the vehicle. These switches close if the vehicle experiences a frontal impact which is severe enough to close the switches. Mechanical sensor-based systems of this type often rely on sensor redundancy to reduce any negative effects of sensor malfunction which may occur. This requires a large number of switches which must be individually tested and strategically placed in the vehicle to ensure proper operation of the entire impact sensing system. These sensing systems can only be activated by mechanical accelerations having the magnitude and duration under which they were designed to operate in a crash. Thus, there is no practical way to test switch response after installing the switches in the car, since the switches can only be activated by large mechanical forces.

Single-point impact sensing systems rely on an accelerometer located in the passenger compartment of the vehicle to constantly monitor the acceleration and sense any sudden deceleration of the vehicle. The output of the accelerometer is continuously analyzed and discriminated to determine if and when any unusual decelerations occur, indicative of vehicle impact. The passenger restraint is activated if the output of the accelerometer senses a severe deceleration which is indicative of an activation worthy event.

Since single-point impact sensing systems do not require the large number of components that mechanical impact sensing systems have, diagnostic circuitry for testing a single-point sensing system can be simplified. System testing on the vehicle after installation involves checking the operation of the accelerometer and the discrimination circuitry rather than a large number of mechanical switches.

One type of impact sensor testing system is described in U.S. Pat. No. 4,359,715 to Langer et al. A diagnostic module is electrically connected to several different electrical locations in the impact sensor to monitor the voltage levels and detect the occurrence of faults at those locations. Upon detection of a fault, a warning lamp displays a signal which is unique depending on the fault type or location which occurred in the impact sensor. The diagnostic module checks for open circuits, short circuits and faulty components within the impact sensor. This type of diagnostic system however, only checks for electrical continuity within the sensing system and proper operation of individual sensor components. No provisions are made in this device to check for gradual changes such as drift or loss of calibration in the sensor.

Another circuit for testing the operation of an impact sensor for use with airbags is described in U.S. Pat. No. 4,243,971 to Suchowerskyj et al. A testing program is initiated when electrical power is applied to the passenger restraint system. The program checks the operation of the discrimination circuits by generating a simulated trigger signal at the discriminator input. Proper operation is confirmed if the output power transistor in the output stage of the impact sensor becomes conductive. The output stage is also tested for electrical continuity to ensure that the airbag will be deployed during a high impact condition. Changes in the calibration of the sensor would not be detected in this arrangement. Additionally, the duration of the trigger signal is considered to be critical to proper testing, requiring careful timing considerations which can be adversely affected by regular operating conditions. This criticality in timing is not desirable for a diagnostic circuit since changes in temperature or operating environment can change the response of the circuit.

U.S. Pat. No. 5,060,504 to White et al. describes a method for self-calibrating an accelerometer. The output of an electrical control circuit for the accelerometer is periodically calibrated by electrostatically displacing a sensing mass in the accelerometer relative to a frame. The displacement caused by the electrostatic force is analogous to a displacement caused by a known acceleration. The resultant change in output in the control circuit is used as a reference value for calibrating subsequent output changes caused by acceleration. The electrostatic displacement of the sensing mass in the accelerometer is used to correct calibration changes within the accelerometer, but there is no circuitry which can be adapted to test the functioning of the accelerometer in conjunction with associated discrimination circuitry to correctly sense an activation worthy event.

DISCLOSURE OF THE INVENTION

It is therefore an object of the present invention to provide a simple diagnostic method and apparatus for self-testing an impact sensing system after installation of the system in the vehicle.

It is also an object of the present invention to provide a self-testing method and apparatus which can diagnose both hard failures such as a malfunction or reduced function of the sensing system components as well as soft failures such as drift, loss of calibration, and loss of memory.

Another object of the invention is to test and diagnose proper functioning of an impact sensing system without excessive additional circuitry.

Accordingly, an impact sensing system for a passenger restraint mechanism has an impact sensor with a deflectable sense element which deflects in response to acceleration occurring normal to the plane of the impact sensor. An electrically conductive self-test plate is disposed in proximity to the sense element. In a preferred embodiment, self-test plates are placed beneath the sense element. The self-test plate provides an electrostatic force which electrostatically deflects the sense element when a voltage is applied to the plate. The amount of electrostatic force preferably causes the sense element to deflect in the same way as during an activation worthy event.

The self-test plate is preferably wired independently from the impact sensing system so that the system cannot distinguish between the self-test mode and actual acceleration. In this manner, the response of the impact sensing system during self-test would be identical to the response during acceleration. More specifically, the deflection during self-test is indistinguishable from a deflection during an activation worthy impact, causing a first portion of the decision circuitry in the impact sensing system to indicate a high impact condition. An activation flag in the decision circuitry consequently changes state in response to the simulated activation worthy event. Actual activation of the restraint is prevented by a second portion blocking the activation signal path to the restraint prior to initiation of the self-test sequence.

The test time for response of each portion between the initiation of the self-test sequence and the change of state in the activation flag is compared with an expected response time during the same time interval. The expected response time is stored in a programmable memory during sensor calibration at manufacture. Any differences between the test response time and the expected response time is indicative of a fault in the sensing system such as drift or loss of calibration. Significant differences can be indicative of a hard failure such as circuit discontinuity within the impact sensing system.

By testing the entire impact sensing system in this manner, the mechanical function of the sense element, the continuity of the entire circuit, and the calibration of the impact sensor can be tested simultaneously. This testing method and apparatus can detect not only hard failures in the impact sensing system such as open circuits and component malfunction, but also drift and loss of calibration in the system circuitry. Preferably, the self-test sequence will be initiated each time the ignition in the vehicle is turned on.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
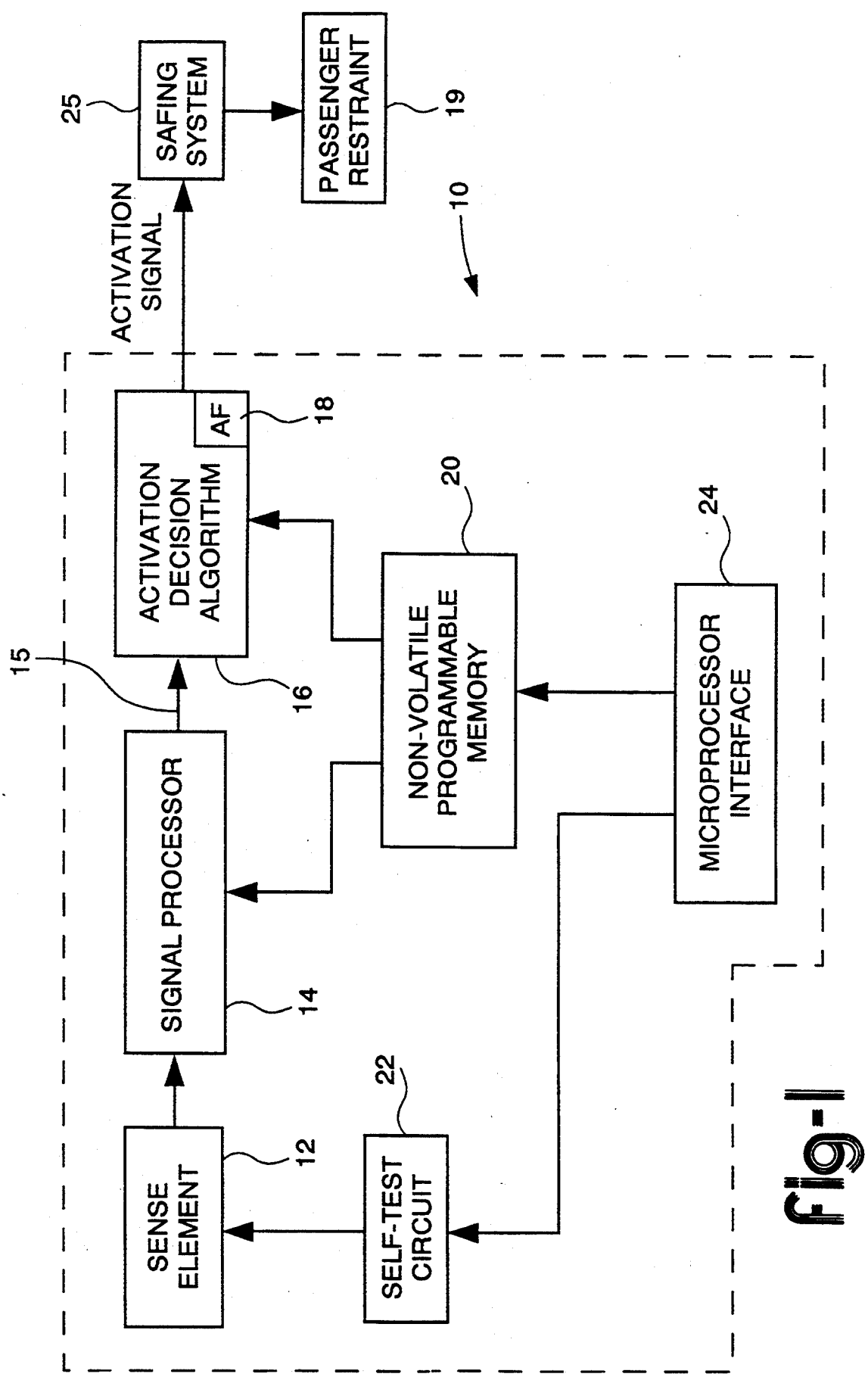
FIG. 1 is a block diagram illustrating an impact sensing system utilizing the self-testing method and apparatus of the present invention.

Referring to FIG. 1, a single-point impact sensing system for a vehicle passenger restraint mechanism has an impact sensor 10 with a sense element 12, a signal processor 14 and an activation decision algorithm 16 for sensing and analyzing accelerations experienced by the vehicle. The decision algorithm 16 has an activation flag 18 which changes state if the accelerometer output from the signal processor 14 indicates the occurrence of a high impact, activation worthy event. When the activations flag 18 changes state, an activation signal activates a passenger restraint 19. A non-volatile programmable memory 20 and a self-test circuit 22 using the method and apparatus of the invention are preferably placed in the sensor 10 and made accessible to a microprocessor by a microprocessor interface 24. Inadvertent activation of the passenger restraint 19 during the self-test sequence is prevented by a safing system 25 that employs a second portion of decision algorithm 16 to change an actuation flag which blocks the activation signal path to the restraint 19 only during self-test.

Figure 2:
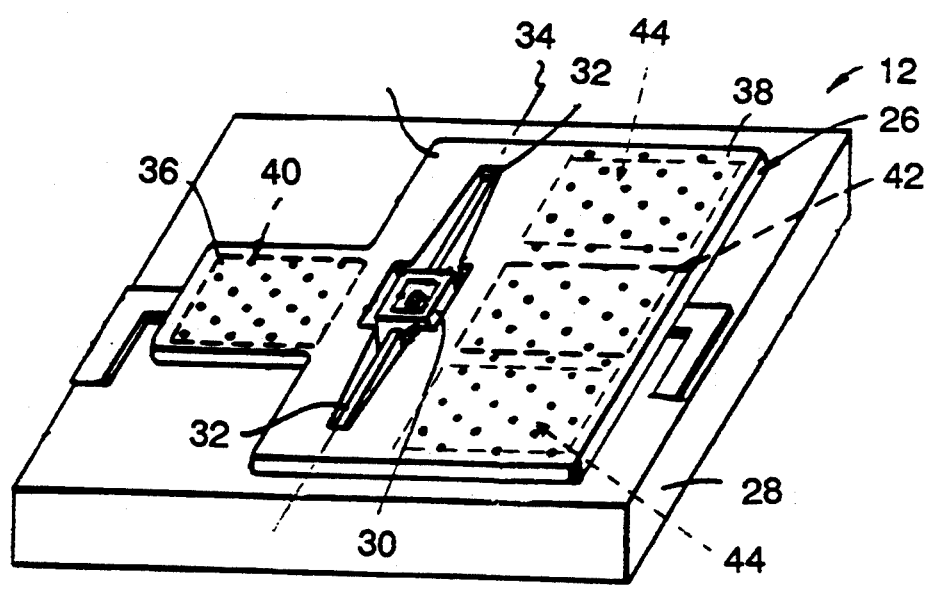
FIG. 2 is a perspective view of a sense element having a preferred embodiment of the self-testing apparatus of the present invention.

Turning to each component in more detail, the sense element 12 of the impact sensor 10 is of a type which deflects or otherwise responds physically during an acceleration. The sense element can be any type which is mechanically responsive and which can vary its response with different magnitudes of force. Preferably, the sense element 12 is a capacitive sense element which is tiltable about a flexure axis in response to forces normal to the plane of the impact sensor 10. This type of sense element 12 is shown in FIG. 2.

The sense element 12 preferably has a deflectable upper plate 26 which is positioned above a substrate 28. The upper plate 26 and the substrate 28 are substantially parallel to one another in the absence of accelerations and gravitational forces normal to the plane of the sense element 12. The upper plate 26 is supported on the substrate 28 by a pedestal 30 which is bonded to the substrate 28. Torsion arms 32 define a flexure axis 34 about which the upper plate 26 tilts in response to accelerations normal to it surface. The flexure axis 34 divides the upper plate to form first and second portions 36 and 38. The degree of deflection will be approximately proportional to the magnitude of the acceleration. Fixed conductive plates 40 and 42 disposed on the substrate 28, together with first and second portions 36 and 38, form two capacitors which also vary in magnitude proportionally to the magnitude of the acceleration.

Those skilled in the art will note that other mechanically responsive sense elements which generate electrical signals indicative of the magnitude of the acceleration can be used in conjunction with the method and apparatus of the invention without departing from its spirit and scope.

The output of sense element 12 is sent to signal processor 14 which converts the sense element output into a form 15 which can be easily analyzed by activation decision algorithm 16. Preferably, the changes in capacitance of the capacitive sense element 12 are converted into a pulse density modulated signal wherein the number of pulses in a predetermined time interval is proportional to the acceleration sensed by the sense element 12. The algorithm 16 then constantly monitors the pulse density modulated signal according to a set of predetermined parameters to determine if any sensed sudden decelerations are a result of an activation worthy event. If the number of pulses during a given period of time exceeds a certain threshold in the algorithm 16, the activation flag 18 changes state, indicating an activation worthy event.

Preferably, the activation decision algorithm 16 has more than one predetermined threshold to ensure that the passenger restraint is activated only when necessary. Using a plurality of thresholds helps prevent inadvertent activation of the passenger restraint when it is not needed, such as during a mild impact event.

Figure 3:
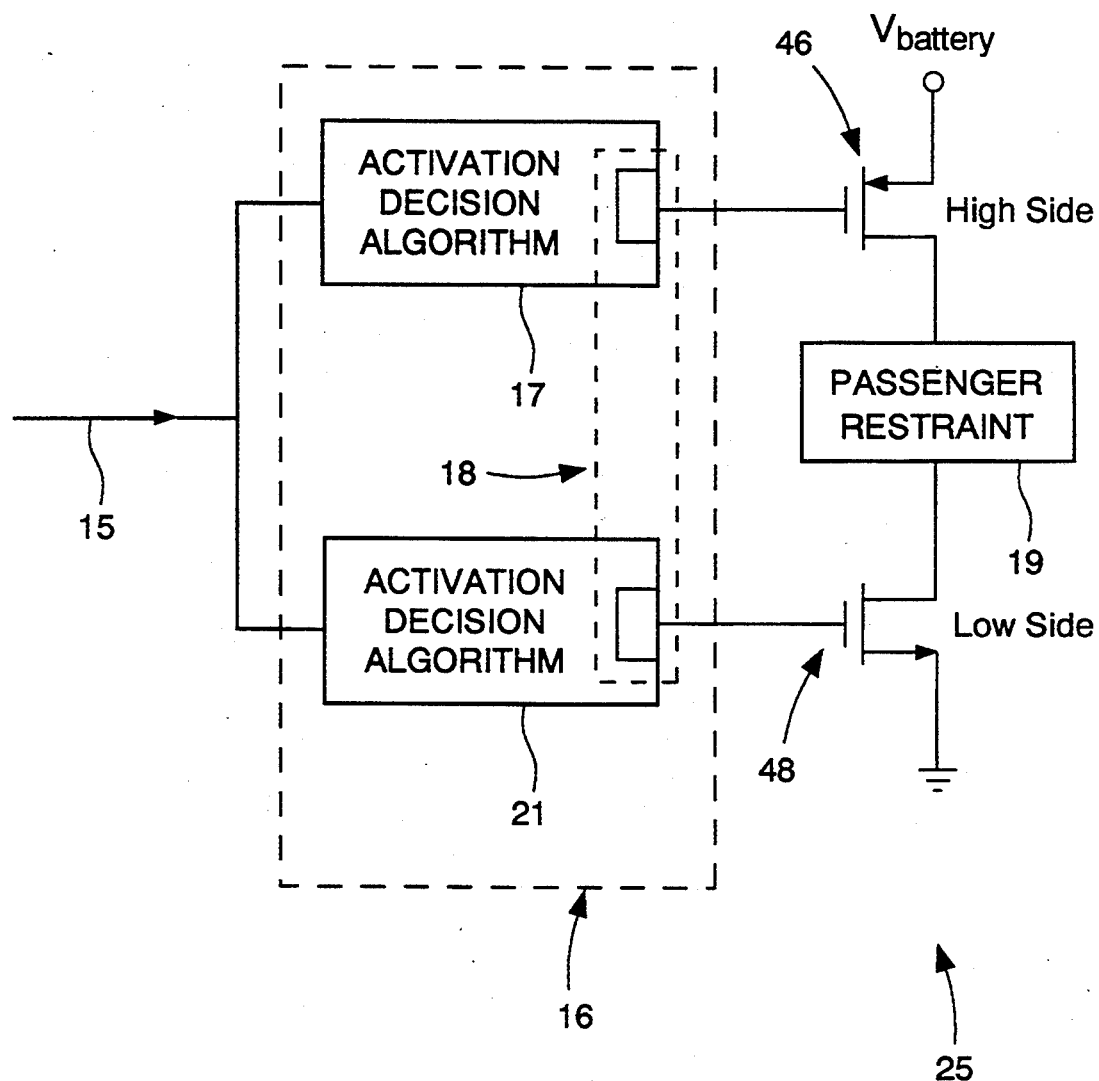
FIG. 3 is a schematic diagram of one embodiment of the safing system used to prevent activation of the passenger restraint during the self-test sequence of the invention.

As stated previously, the activation flag 18 in a first portion 21 of the activation decision algorithm 16 as shown in FIG. 3 changes state if the algorithm 21 determines the existence of an activation worthy impact condition. When the activation flag 18 responsive to the first portion 21 changes state, the activation signal activates the passenger restraint unless the safing system 25 including a second portion 17 of algorithm 16 as shown in FIG. 3 prevents the activation signal from reaching the restraint 19 during self-test.

Thresholds and parameters for portions 17 and 21 of the activation decision algorithm 16 as shown in FIG. 3 are preferably stored in the non-volatile programmable memory 20. During calibration after system manufacture, the sense element 12 in the impact sensor 10 is deflected in the same manner as during an activation worthy event and the time between the deflection of the sense element 12 and the change of state in the activation flag 18 is stored in memory 20. This expected sensing system response time will later be used as a reference to diagnose and test the operation of the system after it is installed in the vehicle.

A deflecting means such as a self-test plate 44 is placed in proximity to the sense element 12 in order to provide an electrostatic force on the sense element 12 when voltage is applied to the plate 44. The generated electrostatic force deflects the sense element 12 in the same manner as a typical activation worthy event. More than one self-test plate 44 can be used to provide the electrostatic force. The plates 44 can be disposed on the sense element itself or placed in the impact sensor separately from the sense element. In the preferred embodiment shown in FIG. 2, a pair of self-test plates 44 are placed on the substrate 28 on either side of the fixed conductive plate 42, underneath the second portion 38 of the upper plate 26 of the sense element 12. The self-test circuitry is preferably wired independently from the impact sensor 10 to ensure that the sensing system response during the self-test sequence is indistinguishable from a response during an actual impact event.

FIG. 3 illustrates one embodiment of the safing system 25 in more detail. Since the system response during self-test is identical to response during an activation worthy event, inadvertent activation of the passenger restraint 19 must be prevented during self-test. The signal path can be interrupted using a mechanical switch which opens in response to a safing signal. However, metal oxide semiconductors (MOS) transistors are preferred for preventing activation of the restraint 19 during self-test.

In the embodiment shown in FIG. 3, a low-to-high transition of the activation flag signal is assumed for purposes of explanation and not limitation. The gate of an PMOS transistor 46 is connected to the activation flag signal of path portion of algorithm 16 wherein the increase in voltage between the gate and the source decreases the resistance between the drain and the source, allowing current to flow through. The gate of a PMOS transistor 48 is connected to the activation flag signal of path portion 21 of algorithm 16 to form a complementary MOS (CMOS) inverter configuration. The passenger restraint 19 is connected to the drains of the MOS transistors 46 and 48 so that current can flow to the restraint 19 during a normal activation worthy event. The PMOS transistor 48, unlike the NMOS transistor 46, experiences an increase in the resistance between the drain and the source when the voltage between the gate and the source increases.

During the self-test sequence, current flow to the passenger restraint 19 must be prevented to avoid unnecessary activation of the restraint 19. A safing signal is applied to the gate of the PMOS transistor 48 prior to initiation of the actual self test sequence. Preferably, the safing signal is a voltage increase supplied by a battery or other voltage source (not shown). When the activation signal 15 goes from low to high, only the NMOS transistor 46 conducts current because of the presence of the safing signal. The voltage at the passenger restraint 19 remains low, preventing inadvertent activation of the restraint 19.

The safing signal is removed after completion of the self-test sequence. Without the safing signal, both the NMOS transistor 46 and the NMOS transistor conduct current. The voltage at the passenger restraint 19 then rises, activating the restraint 19.

Figure 4:
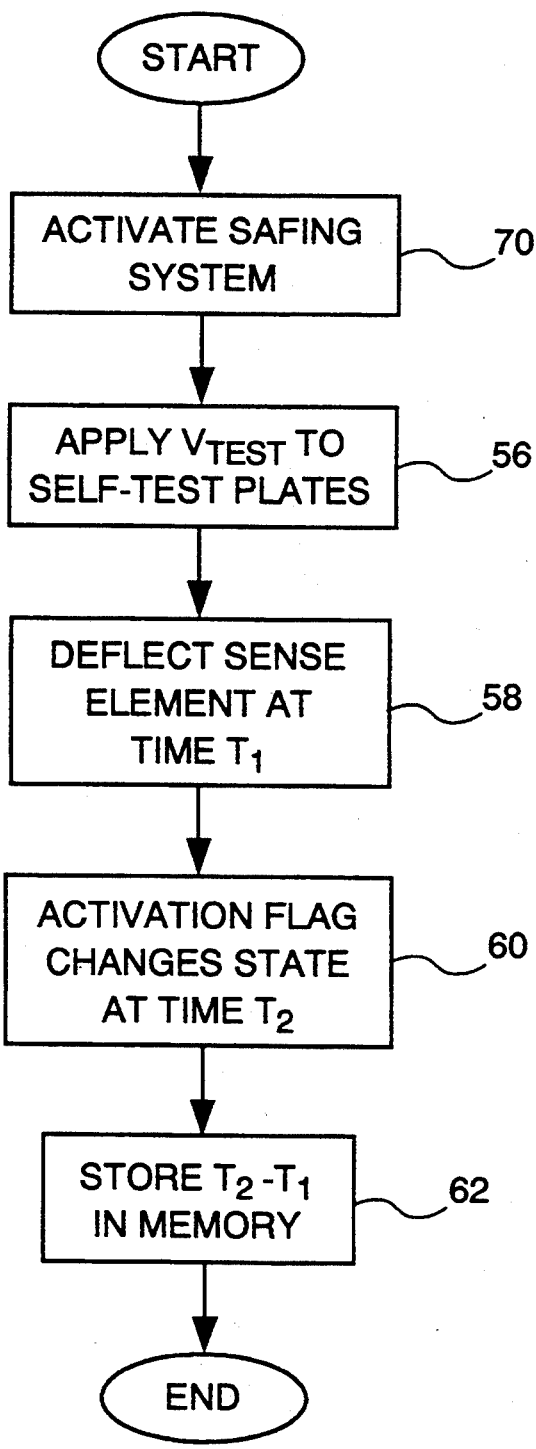
FIGS. 4 and 5 are block diagrams illustrating the operation and the self-testing method of the present invention.

Referring to FIG. 4, reference parameters for use in the self-testing sequence for each portion 17 and 21 of algorithm 16 are stored in memory 20 during sensor calibration at manufacture. A test voltage $V_{TEST}$ is first applied, as shown at 56, to the self-test plates 44 to electrostatically deflect the sense element in the same manner as during an activation worthy event as shown at 58 in FIG. 4. The time that the deflection occurs is stored at time $T_1$. The signal processor 14 and activation decision of portions 17 and 21 of algorithm 16 respond to the deflection of the sense element and consequently the activation flag of each path portion 17 and 21 as shown in FIG. 3 changes state at time $T_2$ 60. The time between the deflection of the sense element and the change in state of each activation flag 18, or $T_2-T_1$, is then stored in memory as shown at 62 for use as an expected sensor response reference value during the self-testing sequence. This value will be compared later with the time between the issuance of the self-test command and the time the activation flag changes state during self-test.

Figure 5:
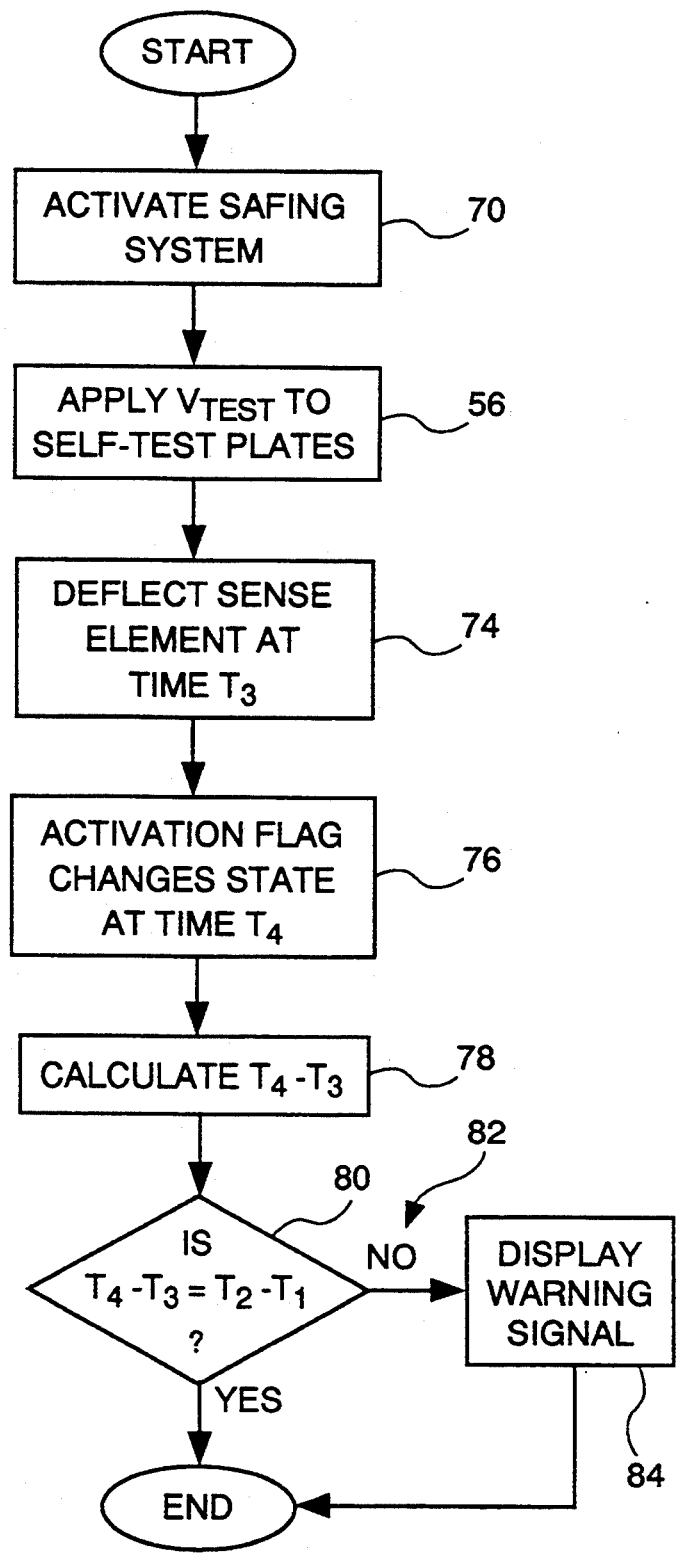

FIG. 5 illustrates the self-testing sequence for diagnosing the impact sensor after it has been installed in the vehicle. A command sequence is preferably initiated each time the vehicle is turned on. The safing system is first activated to prevent inadvertent activation of the passenger restraint during the self-test sequence. A voltage $V_{TEST}$ is applied to the self-test plates 72 in much the same way as during calibration. The generated electrostatic force electrostatically deflects the sense element 74 such that the deflection results in sense element movement, signal processing, and signal evaluation which is indistinguishable from one caused by an activation worthy event. The time at which the sense element deflects is stored as time $T_3$ as shown at 74.

Since the deflection of the sense element simulates an activation worthy event, each activation flag 18 changes state at time $T_4$ as shown at 76. As stated previously, circuitry measures the time between the issuance of the self-test command at 13 which initiates the electrostatic deflection of the sense element and the time $T_4$ when the activation flag changes state, or $T_4-T_3$ as shown at 78 and stores it as a test response time. This test response time is compared to the expected response time that was previously stored in memory at manufacture 80. Any difference between the measured test response time $T_4-T_3$ and the stored expected response time $T_2-T_1$ as shown at 82 would indicate that a hard or soft fault had occurred either in the impact sensor itself, the firing circuitry in the impact sensor, or the self-test circuitry. Detection of a fault in the impact sensing system would result in a warning signal 84 that is presented to the vehicle driver and in certain situations, the restraint activation system would disable itself. The time interval between which system response is measured can be varied without departing from the scope of the invention. The expected response and the test response should be measured between the same intervals for simple comparison.

Self-testing the impact sensing system in this manner requires extremely low electrical power and low voltages. Also, no additional circuitry which influences the operation or function of the self-test feature is required. The impact sensing system does not have to be altered in any way during diagnostic self-testing. The invention allows detection of catastrophic faults such as malfunction or reduced function in any of the impact sensing system components as well as soft failures such as drift, loss of calibration, or loss of memory. This ability to detect a wide variety of faults in the system ensures continuous proper operation during the life of the vehicle.

While the best mode for carrying out the invention has been described in detail, those familiar with the art to which this invention relates will recognize various alternative designs and embodiments for practicing the invention as defined by the following claims.

We claim:

1. A fault detecting apparatus for use in a vehicle impact sensing system which controls activation of a vehicle passenger restraint, the impact sensing system having a sense element which is responsive to vehicle acceleration, means for evaluating the sense element response to discriminate between an activation worthy and a non-activation worthy event, and means for indicating an activation worthy event in electrical communication with the evaluating means, the apparatus comprising:

means for storing an expected impact sensing system response time period to an activation worthy event which is indicative of proper operation of the impact sensing system from initiation to change in state of activation output;

means for generating a test response from the impact sensing system wherein the test response is the same as a response caused by an activation worthy event;

means for measuring a time period result of the test response from initiation to change in state of activation output; and means for comparing the test response time period result with the expected response time period wherein a difference between the test response time period result and the expected response time period is indicative of a fault in the impact sensing system.

2. The apparatus of claim 1 wherein the storing means comprises a non-volatile programmable memory.

3. The apparatus of claim 1 wherein the generating means comprises means for generating an electrostatic force for actuating the sense element.

4. The apparatus of claim 1 wherein the generating means includes:

a conductive plate disposed in proximity to the sense element to electrostatically actuate the sense element when energy is applied to the conductive plate; and means for generating energy to actuate the conductive plate.

5. The apparatus of claim 1 wherein the generating means is controlled independently of the impact sensing system such that operation of the impact sensing system during generation of the test response is indistinguishable from operation during acceleration.

6. The apparatus of claim 1 wherein the indicating means comprises an activation flag in electrical communication with the evaluating means which changes state when the evaluating means indicates an activation worthy event.

7. The apparatus of claim 1 further comprising means for preventing activation of the passenger restraint in response to the generated test response, and means for measuring the time period result of the test response from initiation to change in state of activation output in said means for preventing actuation.

8. A fault-detecting apparatus for use in a vehicle impact sensing system which controls activation of a vehicle passenger restraint, the impact sensing system having a sense element which is deflectable in response to vehicle acceleration, means for evaluating the sense element response to discriminate between an activation worthy and a non-activation worthy event, and an activation flag which changes state when the evaluating means indicates an activation worthy event, the apparatus comprising:

means for storing an expected impact sensing system time period response to an activation worthy event which is indicative of proper operation of the sensing system from initiation to change in state of activation output, the expected time period response being measured from the time at which the sense element is deflected to the time at which the activation flag changes state;

means for generating a test response of the impact sensing system by deflecting the sense element wherein the test response caused by the means for generating is the same as a response caused by an activation worthy event;

means for measuring a time period result of the test response to an activation worthy event, the time period extending from the time at which the sense element is deflected by the means for generating to the time at which the activation flag changes state; and means for comparing the test response time period result with the expected time period response wherein differences between the test response time period result and the expected time period response is indicative of a fault in the impact sensing system.

9. The apparatus of claim 8 wherein the storing means is a non-volatile programmable memory.

10. The apparatus of claim 8 wherein the for generating means provides an electrostatic force for deflecting the sense element.

11. The apparatus of claim 8 wherein the generating means includes:

a conductive plate disposed in proximity to the sense element to provide an electrostatic force on the sense element when energy is applied to the conductive plate; and means for generating energy to actuate the conductive plate.

12. The apparatus of claim 8 wherein the generating means is controlled independently of the impact sensing system such that operation of the impact sensing system during generation of the test response is indistinguishable from operation during acceleration.

13. A method for diagnosing a vehicle impact sensing system which controls activation of a vehicle passenger restraint, the impact sensing system having a sense element which is responsive to vehicle acceleration, means for evaluating the sense element response to discriminate between an activation worthy and a non-activation worthy event, and means for indicating an activation worthy event in electrical communication with the evaluating means, wherein the indicating means has an activation state and a non-activation state, the method comprising the steps of:

storing a time period result of an impact sensing system response to an activation worthy event that actuates the sensor element, the stored result being an expected response time period indicative of proper operation of the sensing system from initiation to change in state of activation output;

generating a test response from the impact sensing system by actuating the sense element wherein the impact sensing system response is the same as a response caused by an activation worthy event;

measuring a time period result of the test response from initiation to change in state of activation output; and comparing the test response time period result with the expected response time period wherein differences between the test response time period result and the expected response time period is indicative of a fault in the impact sensing system.

14. The method of claim 13 wherein the expected response time period and the test response time period result are measured between the same initiation and change in state events.

15. The method of claim 13 wherein the expected response time period is measured between the time at which the sense element is actuated and the time at which the indicating means changes state.

16. The method of claim 13 wherein the test response time period result is measured between the time at which the sense element is actuated and the time at which the indicating means changes state.

17. The method of claim 13 wherein the actuating step comprises generating an electrostatic force on the sense element to electrostatically actuate the sense element.

* * * * *